L. Dow,
Diamond Stone-Drill.

Nº 51,814.          Patented Jan. 2, 1866.

Witnesses,
J. M. Ahearne Jr
Thos Fusch

Inventor,
Lorenzo Dow
Munn & Co
Attorneys

UNITED STATES PATENT OFFICE.

LORENZO DOW, OF NEW YORK, N. Y.

IMPROVEMENT IN DRILLS FOR ROCK-BORING.

Specification forming part of Letters Patent No. 51,814, dated January 2, 1866; antedated December 28, 1865.

*To all whom it may concern:*

Be it known that I, LORENZO DOW, of No. 170 Broadway, in the city, county, and State of New York, have invented a new and useful Improvement in Tools or Drills for Boring Rock; and I do hereby declare that the following is a full, clear, and exact description thereof, which will enable others skilled in the art to make and use the same, reference being had to the accompanying drawings, forming a part of this specification, in which—

Figure 1:
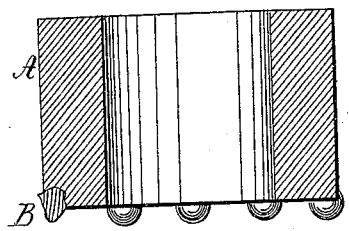
Figure 2:
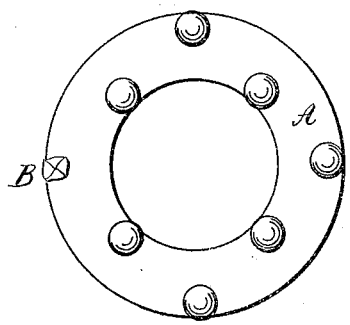

Figure 1 is a vertical section of a tool or drill containing my improvement. Fig. 2 is a face view of the tool.

Similar letters of reference indicate like parts.

This invention consists in forming the cutting or reducing surfaces of tools or drills for boring rock, of sapphires arranged on the face of a crown or stock, so as to make a series of grinding faces or surfaces, by rotating or reciprocating which upon the rock to be bored the latter will be gradually reduced by abrasion or grinding.

In the illustration here given of my invention, A designates an annular or tubular socket or crown of steel or other metal, which composes the stock or part of the stock of the tool or drill. I set in its face, by any secure and proper means, a series of sapphires, one of which is shown at B, Fig. 2. They are arranged or placed in alternation or any suitable order, so as to reduce the rock to be bored over an area slightly exceeding the thickness of the sides of the annular stock A, so as to clear the same of the rock and protect them from being worn by contact with the sides of the bore. They are further to be arranged so that their cutting-surfaces project beyond the face of the stock as well as beyond its sides, as seen in Fig. 1.

I have shown only one sapphire, B, in place in the stock, the positions of others in the series being indicated by red outlines. The sapphires may be more numerous than are here indicated, their number being determined by the nature of the rock or other substance to be bored and the area of the face of the tool and the size of the sapphires used. I have shown in this example a stock with an annular face; but my invention can be employed with any form of stock, care being always taken to arrange the sapphires at such radial distances from each other that their grinding or cutting surfaces will, in the rotary or reciprocating rotary movements intended to be given to the tool when in operation, cut an annular groove or bore of like form with the face of the stock, and the edges of those which are nearest the periphery of the stock project a little beyond that periphery, and the edges of those which are nearest the inner periphery project inwardly beyond that periphery, so as to protect the stock on all sides.

The stock may be tubular and yet have a cutting-face which shall cut a cylindrical bore by having the perimeter of the stock connected by radial arms. In a stock of that form the sapphires are arranged in such a way as that their paths will be circles which overlap each other. I also arrange the sapphires in like manner in stocks with solid faces, or in such as are not intended to be used with tubular drill-rods.

The stock may be secured in any suitable way to a tubular or solid drill-rod, whose outer diameter should not be greater than that of the stock, and whose inner diameter, if it is tubular, is not less than that of the said stock, and such rod is to be rotated or to have a reciprocating rotary motion given to it by any suitable mechanism applied to its outer end, whereby the tool is caused to cut or bore a groove or other depression in the rock similar in form to the face of the tool. The operation of the tool will be greatly assisted by the injection of a stream of water through the tubular stock A, for the purpose of washing out and carrying away the débris and reduced rock from under the tool, which would otherwise be impeded by the accumulation. Such a stream may be thrown in with more or less pressure, by a pump or other suitable appliances connected with the outer end of the drill-rod, by means of a hose.

When the stock and its surfaces are annular the bore or cut produced thereby will, in some kinds of rock, leave a core that may extend above the tool-stock and which can be removed by taking out the tool from the well or other bore being cut and breaking off the core by means of wedges driven into the annular bore, when such core may be drawn out by means of crabs or other appliances. When the cutting-surfaces act on the entire area of the bore, all the débris may be removed by the action of water, as aforesaid.

This invention may also be used for cutting out solid cylinders of stone or other hard substances as well as for boring wells, the diameter of the annular stock being made of suitable size I have not shown in this example of my invention any mode of connecting the stock to a tubular or other drill-rod, nor any mode of rotating the same, or of feeding it as it grinds away the rock, because they are not embraced in my invention, and their application to the same may be made by any artisan who has skill in the art.

I disclaim the invention claimed in the Letters Patent granted to Rodolphe Leschot, July 14, 1863; but, Having thus set forth my invention, what I claim as new, and for which I desire Letters Patent, is—

A ring or stock armed with sapphires, which are disposed in such a manner as to protect the stock while performing its legitimate function of boring or cutting, substantially as herein described.

LORENZO DOW.

Witnesses:
M. M. LIVINGSTON,
C. L. TOPLIFF.